United States Patent
Keahey et al.

(10) Patent No.: US 8,757,332 B2
(45) Date of Patent: Jun. 24, 2014

(54) VENTILATED HEAT SHIELD

(75) Inventors: T. Alan Keahey, Naperville, IL (US); James P. Lill, Rochester, NY (US)

(73) Assignee: Hard Brakes, Inc., Naperville, IL (US)

( * ) Notice: Subject to any disclaimer, the term of this patent is extended or adjusted under 35 U.S.C. 154(b) by 161 days.

(21) Appl. No.: 13/330,808

(22) Filed: Dec. 20, 2011

(65) Prior Publication Data

US 2012/0152610 A1    Jun. 21, 2012

Related U.S. Application Data

(60) Provisional application No. 61/425,364, filed on Dec. 21, 2010.

(51) Int. Cl.
*F16D 65/847*      (2006.01)
*F16D 65/78*      (2006.01)

(52) U.S. Cl.
USPC ............... 188/264 A; 188/251 A; 188/71.6; 188/250 B; 188/250 G; 165/80.3; 165/170; 165/138; 165/139

(58) Field of Classification Search
USPC .......... 188/71.6, 250 B, 250 C, 250 E, 251 R, 188/264 R, 260; 192/113.4; 174/547, 548; 165/136, 138, 139
See application file for complete search history.

(56) References Cited

U.S. PATENT DOCUMENTS

| | | | | |
|---|---|---|---|---|
| 3,361,195 A | * | 1/1968 | Motto, Jr et al. | 165/80.4 |
| 5,123,514 A | * | 6/1992 | Gatins, Jr. | 192/107 R |
| 5,284,227 A | * | 2/1994 | Pelfrey | 188/71.1 |
| 6,206,151 B1 | * | 3/2001 | Nakamura | 188/250 B |
| 2004/0135482 A1 | * | 7/2004 | Thielemans et al. | 313/22 |
| 2006/0027427 A1 | * | 2/2006 | Anda et al. | 188/73.1 |
| 2006/0097384 A1 | * | 5/2006 | Hamann et al. | 257/714 |
| 2006/0266600 A1 | * | 11/2006 | Demers | 188/264 R |
| 2007/0034462 A1 | * | 2/2007 | Themelin et al. | 188/264 R |
| 2012/0067554 A1 | * | 3/2012 | Chen et al. | 165/138 |

* cited by examiner

*Primary Examiner* — Anna Momper
*Assistant Examiner* — San Aung
(74) *Attorney, Agent, or Firm* — McDonnell Boehnen Hulbert & Berghoff LLP

(57) ABSTRACT

Ventilated heat shields and methods are disclosed. The ventilated heat shield can use varying patterns of insulating material with ventilation regions arranged in one or more two-dimensional (2D) and/or three-dimensional (3D) patterns to provide thermal insulation and air channels that allow for dissipation of heat and the inflow of cooling air. The ventilated heat shield can be used in applications where two surfaces are required to be in very close proximity or contact with each other to reduce the transfer of heat from one surface to the other. An example application for the ventilated heat shield is in a vehicle braking system.

17 Claims, 14 Drawing Sheets

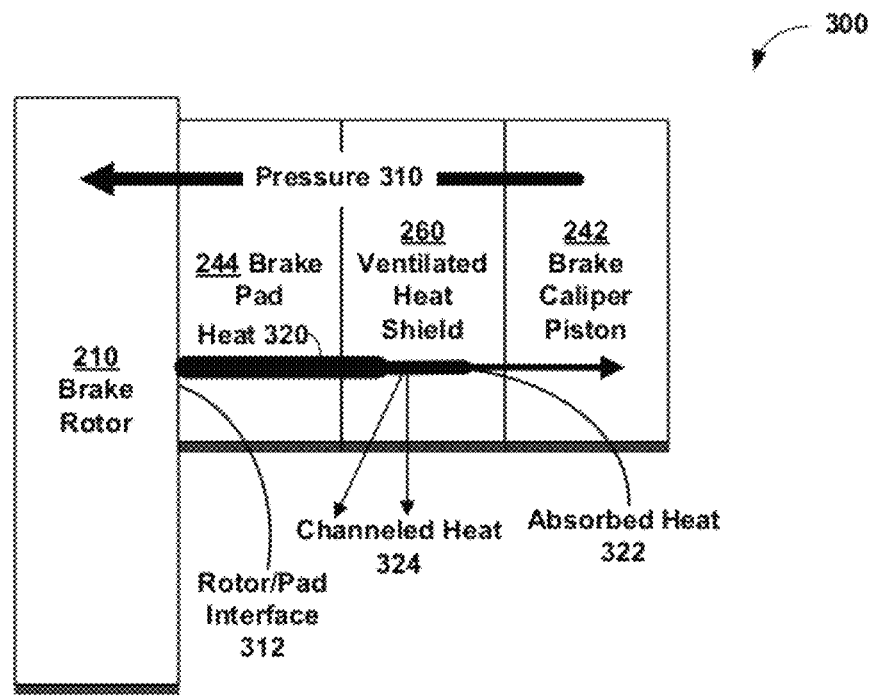
Figure 3
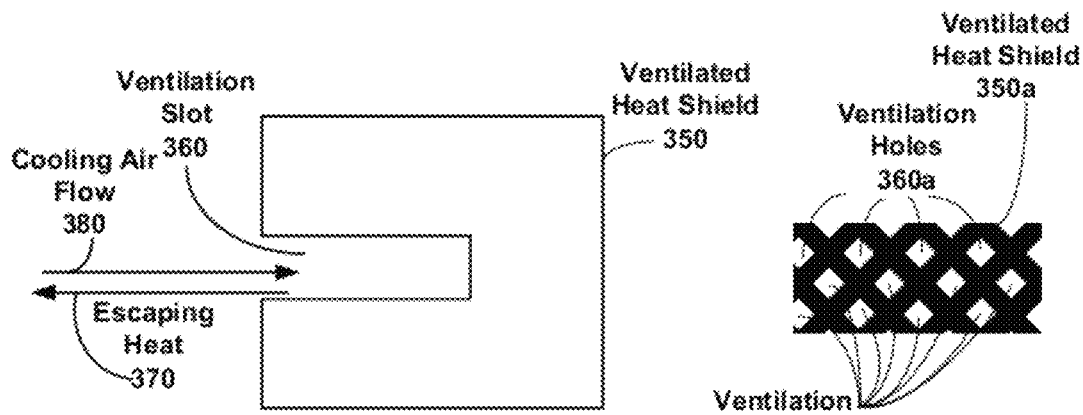
Figure 3A
Figure 3B

Pattern of Ventilation Slots 420

VENTILATED HEAT SHIELD

CROSS-REFERENCE TO RELATED APPLICATIONS

This application claims priority to U.S. Provisional Pat. App. No. 61/425,364, titled "Ventilated Heat Shield", filed Dec. 21, 2010, which is incorporated by reference herein for all purposes.

BACKGROUND

There are numerous applications in which two surfaces are in close proximity or contact to each other, but where heat transfer between the surfaces is not desired. One such example of this application is in the operation of braking systems for vehicles.

Braking systems use friction to slow down objects in motion. A typical braking system application involves pressing high-friction brake pads against a brake rotor disk that is fixed to a wheel of the vehicle. The friction between the brake pads and the rotor converts kinetic energy from the vehicle's motion into thermal energy (heat). When the heat from the friction becomes excessive, the braking system can be compromised. One consequence is in the breakdown of brake components in the vicinity of the pad/rotor contact area, when the heat causes parts to become brittle or warped. Another consequence is in the reduction of braking effectiveness due to excessive heat transfer from the pad/rotor interface into the hydraulic system that creates the pressure between the braking surfaces.

SUMMARY

In a first aspect of the disclosure of the application, one or more apparatus are provided. The one or more apparatus can include a brake pad, a piston, and a heat shield. The heat shield can be made of a material. The heat shield can include a pattern of one or more ventilation regions. The heat shield can be configured to be placed between the brake pad and the piston to reduce transfer of heat from at least a portion of a surface of the brake pad to a surface of the caliper piston at least by insulation and air flow. The air flow can be directed by the pattern of the one or more ventilation regions away from the portion of the brake pad.

In a second aspect of the disclosure of the application, one or more methods are provided. A heat shield can be inserted between a heat source surface of a device and a contact surface of the device. The heat shield can be made of a material. Heat can be transferred from the heat source surface of the device away from the contact surface via insulation by the heat shield and via flow of air directed through a pattern of one or more ventilation regions of the heat shield.

In a third aspect of the disclosure of the application, one or more apparatus is provided. The one or more apparatus includes a heat source surface, a contact surface, and a heat shield. The heat shield can be made of a material. The heat shield can include a pattern of one or more ventilation regions. The heat shield can be configured to be placed between the heat source surface and the contact surface to transfer heat generated by at least a portion the heat source surface away from the contact surface at least by insulation and air flow directed by the pattern of the one or more ventilation regions. In some configurations the heat shield ventilation regions will also allow the flow of cooling air into the portion of the contact surface.

BRIEF DESCRIPTION OF THE FIGURES

FIG. 3 shows an example schematic of pressure and heat transfer from a brake caliper piston through a brake pad to a brake rotor, and the transfer of heat back from the brake rotor to the brake caliper piston.

FIG. 3A shows an example single layer heat shield with a single ventilation channel.

FIG. 3B shows an example single layer heat shield with square ventilation holes.

DETAILED DESCRIPTION

Figure 1:
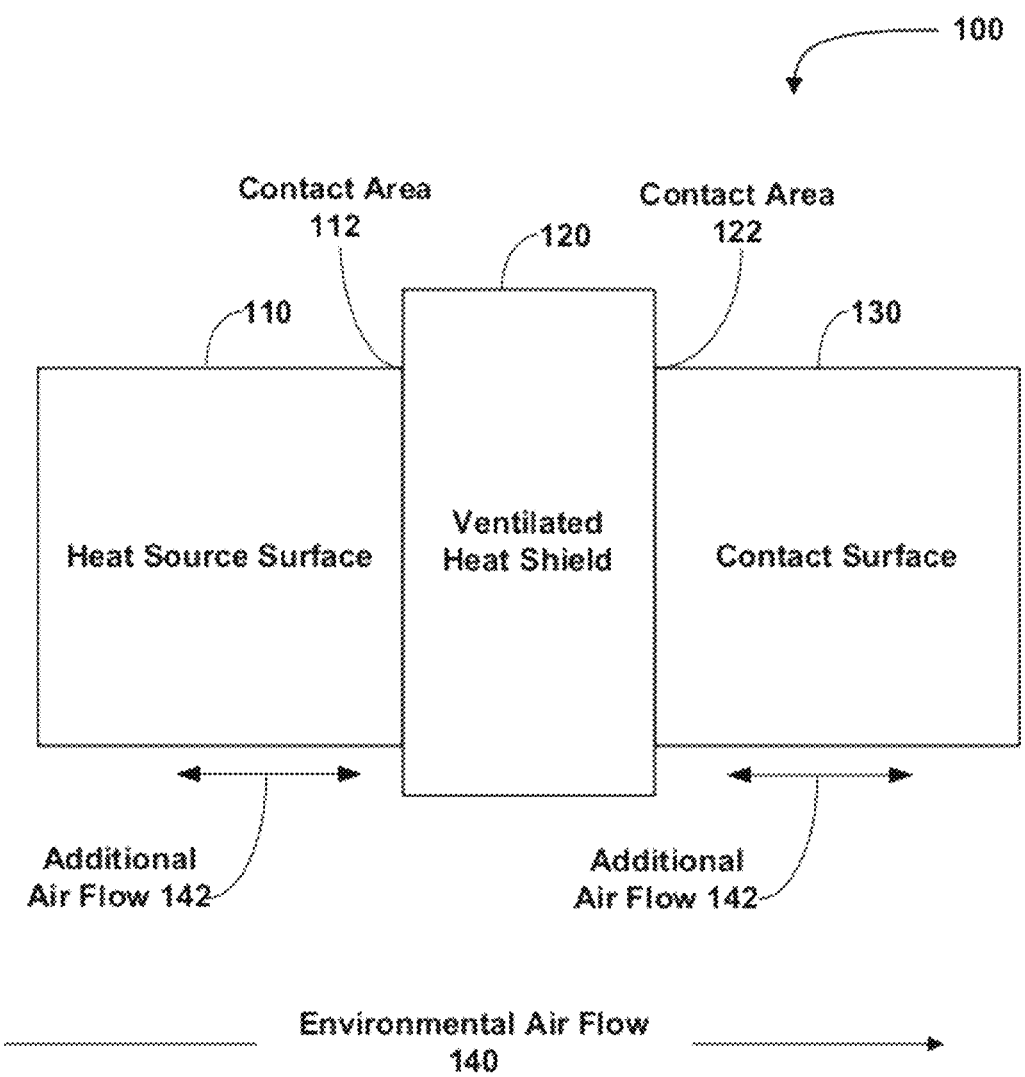
FIG. 1 shows a generic application for an example ventilated heat shield placed between a heat source surface and another surface proximate to the heat source surface.

The following detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A ventilated heat shield is provided for shielding from heat transmission as well as ventilation to allow dissipation of heat and the inflow of cooling air into the area of the heat shield. The ventilated heat shield can be a passive mechanism that involves no moving parts; rather it uses patterns of heat shielding materials alternating with air channels to provide the combination of shielding and ventilation. Ventilated heat shields can be placed between the two surfaces that are required to be in proximity in order to reduce the transfer of heat from one surface to the other.

Such a device can have utility in many types of applications for reducing the flow of heat between two surfaces, or from one area to another. One example use of the device is protecting a vehicle braking system from the heat generated from the friction of the brake pads against the rotors. In that example application, embodiments of the heat shield are thin enough to fit within the brake system, while being robust enough to withstand the significant pressure, heat and vibration caused by the moving vehicle. Another example application is protecting heat sensitive components contained within confined spaces from heat generated by combustion engines. In this example application, embodiments of the heat shield protect the heat sensitive components. In another example application, electronic circuit boards and integrated circuits are packed in extremely high densities. In this example, embodiments of the heat shield described herein can be used to direct the flow of heat into desired directions and away from critical components.

The heat shield can include one or more patterns of "ventilation regions." A ventilation region can include one or more ventilation slots, ventilation holes and/or ventilation grooves. There are a variety of ways in which these patterns can be combined depending on the specific requirements of the application. In a relatively basic form, a pattern includes one or more cut outs of a heat shielding material configured for use as a heat shield. In another form, a material can be partially or completely perforated with a pattern of ventilation regions. For example, the material can be perforated or pre-perforated with a pattern of ventilation holes or slots, while as another example, the material can be scored with a pattern of ventilation holes.

However, more complex patterns of shielding and ventilation can be obtained by stacking two or more layers of heat shields to provide overlapping areas of shielding and ventilation. The patterns can also be modified by altering the direction, size and frequency of the cooling channels. Various properties of the heat shield, such as the ratio of insulation material to ventilation channels, and the orientation of patterns of ventilation slots to allow for the inflow of cooling air and for the dissipation of excess heat, can be varied in different embodiments of the heat shield. Another formulation of the heat shield can be obtained by embedding a two-dimensional pattern directly into one or more of the surfaces that are to be brought into proximity with each other. The heat shield may be in the form of a planar configuration, or shaped to fit more arbitrary three-dimensional surfaces. Extensions may be added to the heat shield to provide for additional heat dissipating materials and/or to provide increased airflow into one or more contact areas.

A "ventilated heat shield" is described herein for providing thermal insulation, dissipation of heat, and inflow of cooling air at a boundary between two objects, in order to reduce the flow of heat from one object to the other. The ventilated heat shield is configured to generate patterns of thermal insulation and air channels in two and three-dimensional configurations. In some embodiments, the ventilated heat shield uses no moving parts, and relies on basic principles of thermodynamics and heat flow to modify the transfer of heat across the ventilated heat shield.

FIG. 1 shows an example generic application 100 for an example ventilated heat shield 120. In the example generic application, heat is generated by a heat source (not shown in FIG. 1) and transferred from heat source surface 110 to contact surface 130. The ventilated heat shield 120, when placed between heat source surface 110 and contact surface 130 as shown in FIG. 1, can reduce, or in some cases, eliminate heat transfer between heat source surface 110 to contact surface 130.

In operation, air can flow over heat source surface 110, ventilated heat shield 120, and contact surface 130 in the direction of one or more air flows. As used herein, the term "air" is defined to be air, one or more gases present in the atmosphere of the Earth, one or more gases not present in the atmosphere in the Earth, one or more liquids, and/or combinations thereof. FIG. 1 shows an environmental air flow 140 indicating the flow of air present in an environment of application 100. In some embodiments of application 100, additional air flows, such as additional air flow 142, can be present as well. Additional air flow 142 can include external air that enters from outside of the environment of application 100. For example, additional air flows 142 can include external air directed, forced, and/or blown into the environment of application 100. Other air flows are possible as well, such as thermal flows of air created by heating and cooling of objects that are in proximity to the ventilated heat shield 120 (not shown in FIG. 1). While FIG. 1 shows environmental air flow 140 and additional air flow 142 as directed from left to right (or vice versa), environmental air flow 140 and/or additional air flows 142 can flow in other directions not shown in FIG. 1.

Ventilated heat shield 120 can achieve this change in heat transfer through the use of alternating patterns of thermal insulation and air-cooling channels. A thermal insulation material used in ventilated heat shield 120 can provide a barrier to retard thermal conduction of the heat between the two surfaces 110 and 130. As detailed below, ventilated heat shield 120 can include air channels that utilize air flows, such as environmental air flow 140 and additional air flows 142, to allow hot air to escape—and cool air to enter—contact areas 112 and 122 via thermal convection. The combination of these two methods effectively reduces heat transfer via herein-described overlapping air-channels with insulation material in a two dimensional or three dimensional matrix.

There are a wide variety of applications for the ventilated heat shield, including systems where heat is flows from a contact area, such as contact area 112, toward an interface, such as contact area 122, and it is desired to slow the propagation of that heat to the interface which is in close proximity to the contact area. Examples include closely packed electronics components such as layered integrated circuit boards with processing units, and thermal insulation around combustion engines and their hot exhaust components. In the context of layered circuit boards, ventilated heat shield 120 could be configured to be embodied in a heat sink, perhaps as a surface in contact with the circuit boards, to enhance heat transfer away from the circuit boards.

Figure 2:
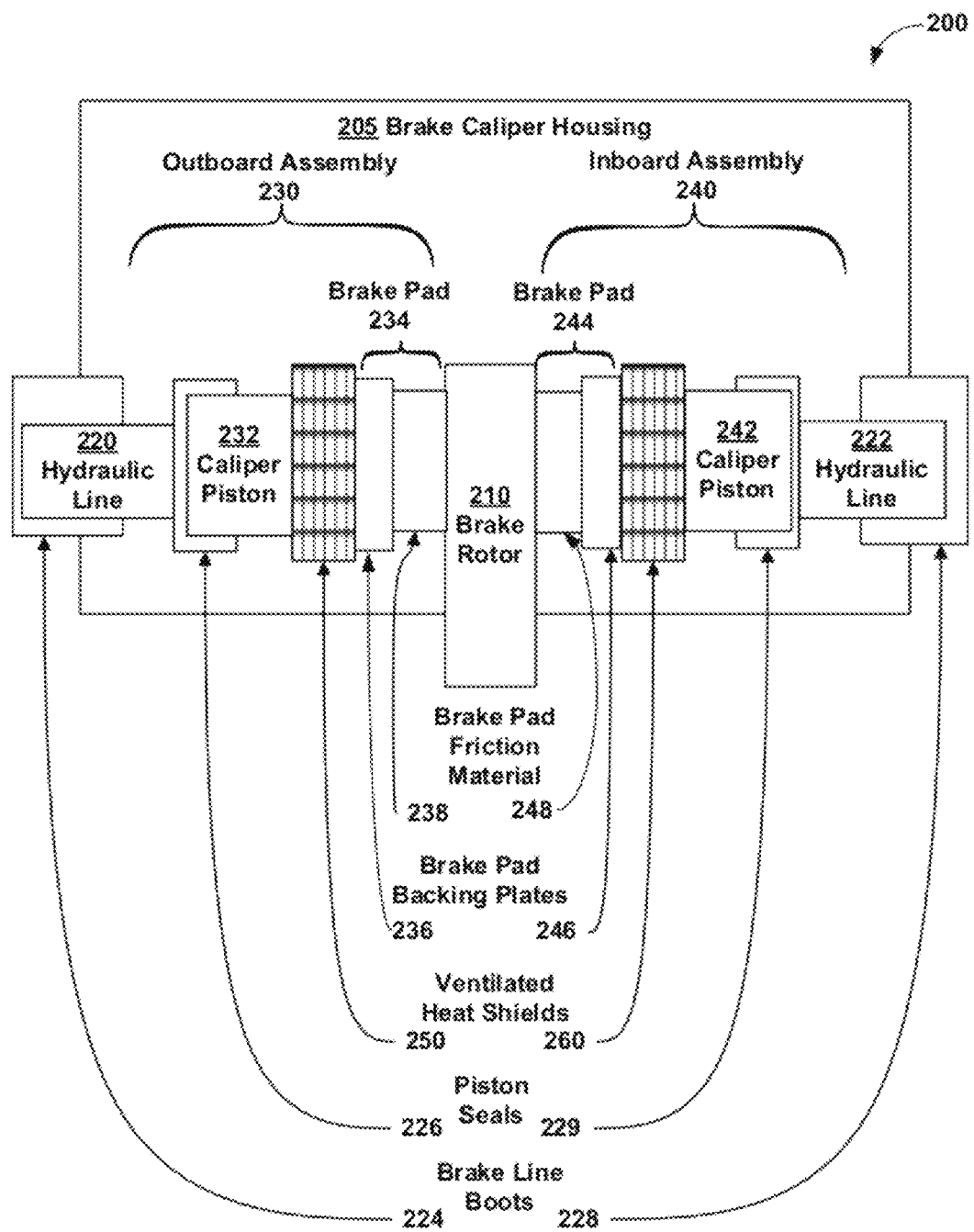
FIG. 2 shows an example disk brake assembly in which an example heat shield is placed between a brake friction pad and hydraulic caliper piston(s) that press the brake friction pad against a brake rotor.

One example embodiment of ventilated heat shield 120 is in the cooling of vehicle braking systems such as the one shown in FIG. 2. In the example braking system 200 of FIG. 2, a brake rotor 210 is affixed to a wheel of a vehicle (not shown in FIG. 2) and rotates along with the wheel. When a driver of the vehicle steps on a brake pedal associated with braking system 200, the pressure on the pedal is amplified by a hydraulic system that includes hydraulic lines 220, 222. Brake fluid in hydraulic lines 220, 222 in turn, apply pressure on respective brake caliper pistons 232, 242 which in turn presses respective brake pads 234, 244 against the brake rotor 210 so as to slow rotation of the rotor 210 and, thus, the speed of the vehicle. The friction of the brake pads 234, 244 against the rotating rotor 210 causes heat to be generated, and this heat can have negative impacts upon the brake system 200.

One negative impact is that the repeated exposure to heat can compromise the flexible piston seals 226, 229 around respective brake caliper pistons 232, 242 and respective hydraulic brake line boots 224, 228 causing piston seals 226, 229 and/or brake line boots 224, 228 to become brittle and eventually fail. Another negative impact is that the heat can be transmitted from the brake pad friction material 238, 248 through the respective caliper pistons 232, 242 to brake fluid within respective hydraulic lines 220, 222. Over-heated brake fluid can vaporize, resulting in a sudden loss of hydraulic pressure and lack of effectiveness in braking system 200. To reduce heat flow, ventilated heat shields 250, 260 can be used. In the example braking system 200 shown in FIG. 2, ventilated heat shields 250, 260 respectively can be fitted between brake friction pads 234, 244 and the brake caliper pistons 232, 242 to reduce the flow of heat from the brake friction pads 234, 244 to the remainder of braking system 200.

FIG. 3 shows an example schematic diagram 300 of heat and pressure transfer between brake caliper piston 244 and brake rotor 210. In operation, hydraulic pressure 310 is applied to the brake caliper piston 242, through the ventilated heat shield 260, and brake pad 244 to force brake pad 244 against the brake rotor 210. This pressure of brake pad 244 against brake rotor 210 creates friction, which in turn generates heat 320 at the rotor/pad interface 312. Much of heat 320 can be transferred via conduction heat transfer from brake rotor 210, through brake pad 244, and then into the caliper piston 242 and the hydraulic fluid (not shown in FIG. 3) that creates pressure 310. The ventilated heat shield 260 can reduce the flow of heat 320 from the brake pad to the brake piston, by absorbing some of the heat as absorbed heat 322, and by channeling heat as channeled heat 324 into other directions than the direction of heat 320.

Ventilated heat shield 260 can reduce heat transfer from brake pad 244 to caliper piston 242 by insulating caliper piston 242 to absorb absorbed heat 322. Also, ventilated heat shield 260 can direct air flow away from brake pad 244 and caliper piston 242. The directed air flow can carry heat, and thus transfer heat from caliper piston 242, such as channeled heat 324, away from caliper piston 242.

FIG. 3A shows an example ventilated heat shield 350 having a single ventilation slot 360. The heat shield 350 is shown from the point of view of a point along the axis of pressure between the caliper piston 242 and the brake pad 244. Ventilation slot 360 allows escaping heat 370 to escape from the interior of the plane of the heat shield 350, and for cooling air flow 380 to enter the interior of the plane of heat shield 350.

FIG. 3B shows an example ventilated heat shield 350a having a number of square ventilation holes 360a. Ventilation holes 360a, like ventilation slot 360, allow escaping heat to escape from the interior of the plane of the heat shield 350a, and for cooling air to enter the interior of the plane of heat shield 350a.

Figure 4:
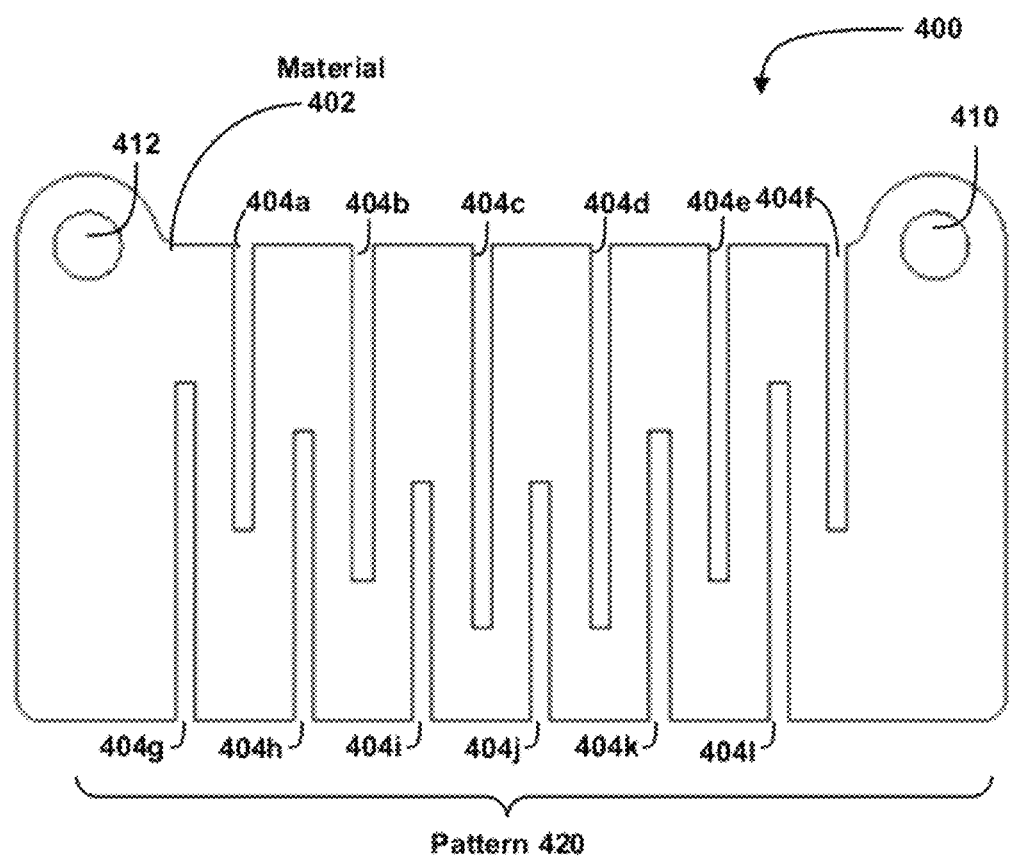
FIG. 4 shows an example single layer ventilated heat shield that is designed to fit with the brake friction pad backing plate shown in FIG. 3.

FIG. 4 shows an example single layer ventilated heat shield 400 designed to fit between a caliper piston, such as caliper piston 232 or 242, and a respective brake pad, such as brake pad 234 or 244. As shown in FIG. 2 above, ventilated heat shields 250, 260 can be placed between brake friction pad backing plates 236, 246 of respective brake pads 234, 244 and the brake caliper pistons 232, 242. The alternating patterns of material 402 and ventilation slots 404a-404l provide alternating areas of thermal insulation and cooling air channels at the interface between brake pad and caliper piston.

Thermal insulation can be provided by material 402. In some embodiments, material 402 can provide a low thermal conductivity, such as a titanium alloy. Other choices for material 402 are also possible depending on the specific application. Generally desirable properties for material 402 are low thermal conductivity, sufficiently rigid to withstand pressures, and sufficiently robust to handle environmental factors such as moisture and vibration. Examples for material 402 include fiberglass and ceramic-based materials, as well as metal alloys.

Ventilated heat shield 400 can be applied to any interface between a brake pad backing plate and a brake caliper piston. For example, holes 410, 412 of ventilated heat shield can permit mounting in a brake caliper via pins (not shown in FIG. 4) that slide through holes 410, 412. Mounting via pins is just an example technique for mounting ventilated heat shield 400. Many other techniques for mounting a disc brake pad within a brake caliper are used in the industry; each technique involves the placement of a pad to accept the pressure of one or more pistons to force the pad against a rotor. The herein-described ventilated heat shield can be placed between then pad and the caliper piston independent of the specific mounting technique used.

FIG. 4 shows that ventilated heat shield 400 includes a pattern 420 of ventilation slots 404a-404l. The pattern 420 includes a top vertical pattern of ventilation slots formed by ventilation slots 404a, 404b, 404c, 404d, 404e, and 404f, and a bottom vertical pattern of ventilation slots formed by ventilation slots 404g, 404h, 404i, 404j, 404k, and 404l. The direction, size and frequency of ventilation slots 404a-404l (and thus pattern 420) can be varied to control the amount of thermal insulation relative to cooling channel capacity and to control the direction and flow of air through the channels.

Figure 5:
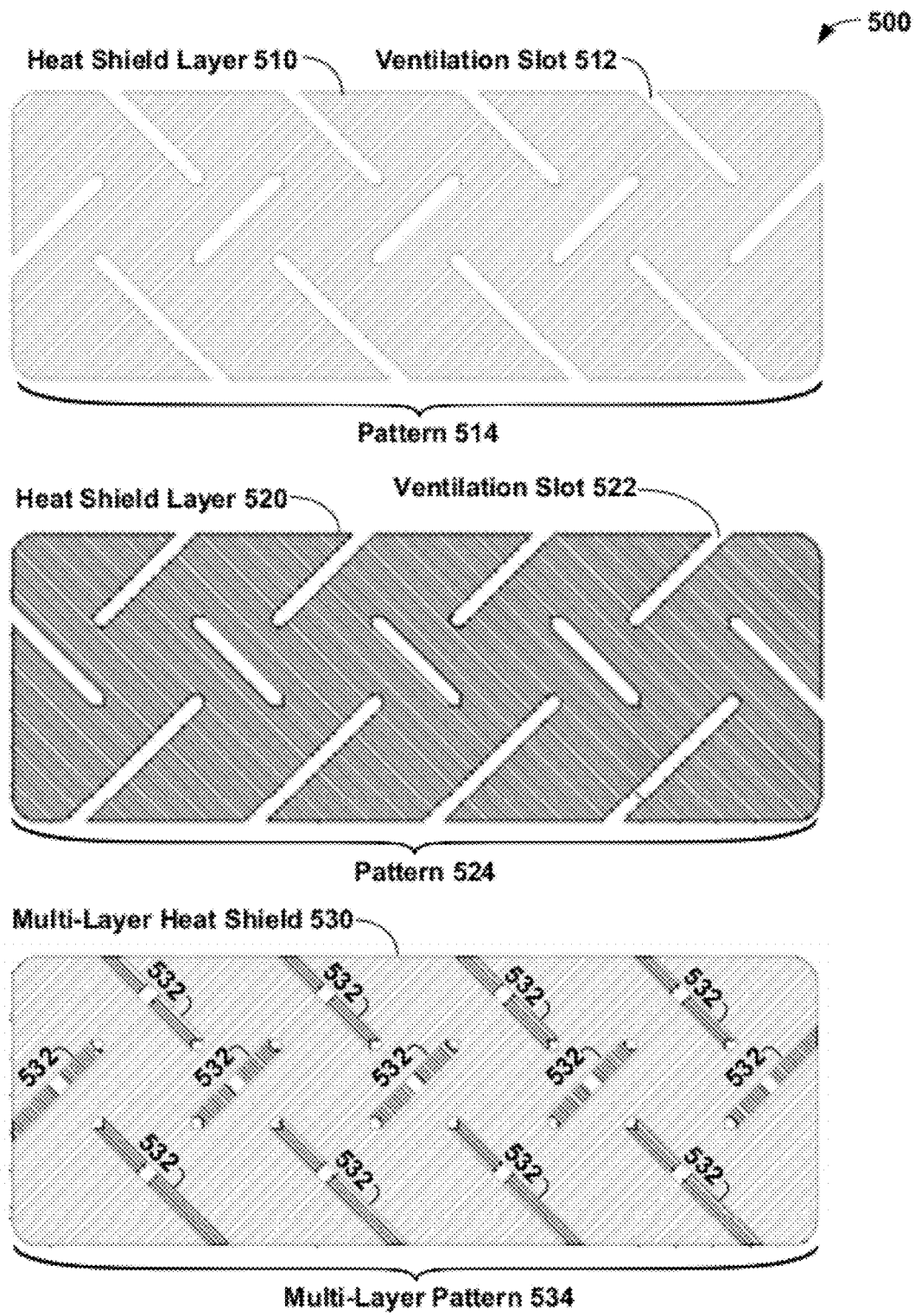
FIG. 5 shows an example two-layer ventilated heat shield that uses a reversed pattern of diagonal slots to provide overlapping areas of ventilation and shielding.

Another example embodiment of the ventilated heat shield is an example multi-layer heat shield 530 shown in FIG. 5 with layers 510 and 520. Here the ventilation slots 512 of layer 510 are shown in a first diagonal pattern 514 and ventilation slots 522 of layer 520 are shown in a second diagonal pattern 524. One technique to generate a second diagonal pattern 524 of layer 520 is to reverse (by flipping about the vertical axis) layer 510. Multi-layer heat shield 530 can be generated by overlaying layers 510 and 520, which in turn includes a multi-layer, three dimensional pattern of ventilation slots 532 is created. The multi-layer pattern 534 of multi-layer heat shield 530 has alternating areas of insulating material and cooling air channels both within the plane of the heat shield and orthogonal to that plane through the layers 510, 520 of the multi-layer heat shield 530.

In an embodiment not shown in either FIG. 4 or FIG. 5, a multi-layer heat shield can include at least two layers: one layer being a single-layer heat shield 400 with pattern 420 of ventilation slots and a second layer being another single-layer heat shield with a reverse pattern from pattern 420 of ventilation slots. Multi-layer pattern 534 creates continuous channels of air that crisscross the multi-layer heat shield 530 by use of the ventilation slots 532.

Figure 5A:
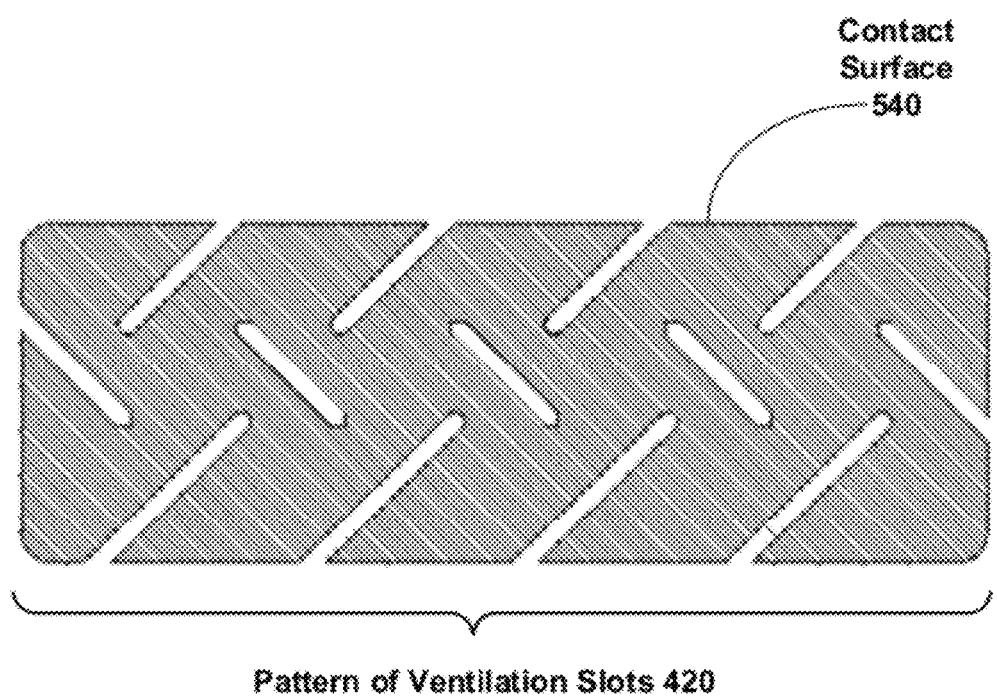
FIG. 5A shows an example contact surface with a pattern of ventilation slots in accordance with an example embodiment.

In some embodiments, a contact surface such as contact surface 130, or a surface of caliper piston 232 in contact with brake pad 234, can be embedded with ventilation slots. FIG. 5A shows an example contact surface 540 with the pattern of ventilation slots 420 in accordance with an example embodiment. Embedding the channels directly into contact surface 130 allows for the addition of relatively deep cooling channels without adding to the thickness of the heat shield interface between the heat source surface 110 and contact surface 130.

In other embodiments, contact surface 540 can have differing sizes or shapes than the size and shape of contact surface 540 shown in FIG. 5. In still other embodiments not shown in FIG. 5A, other patterns of ventilation slots rather than pattern of ventilation slots 420 can be utilized. In even further embodiments not shown in FIG. 5A, a heat source surface, such as heat source surface 110, can be embedded with a pattern of ventilation slots. For example, a brake pad, perhaps acting as a heat source surface, can be embedded with the pattern of ventilation slots.

Figure 6A:
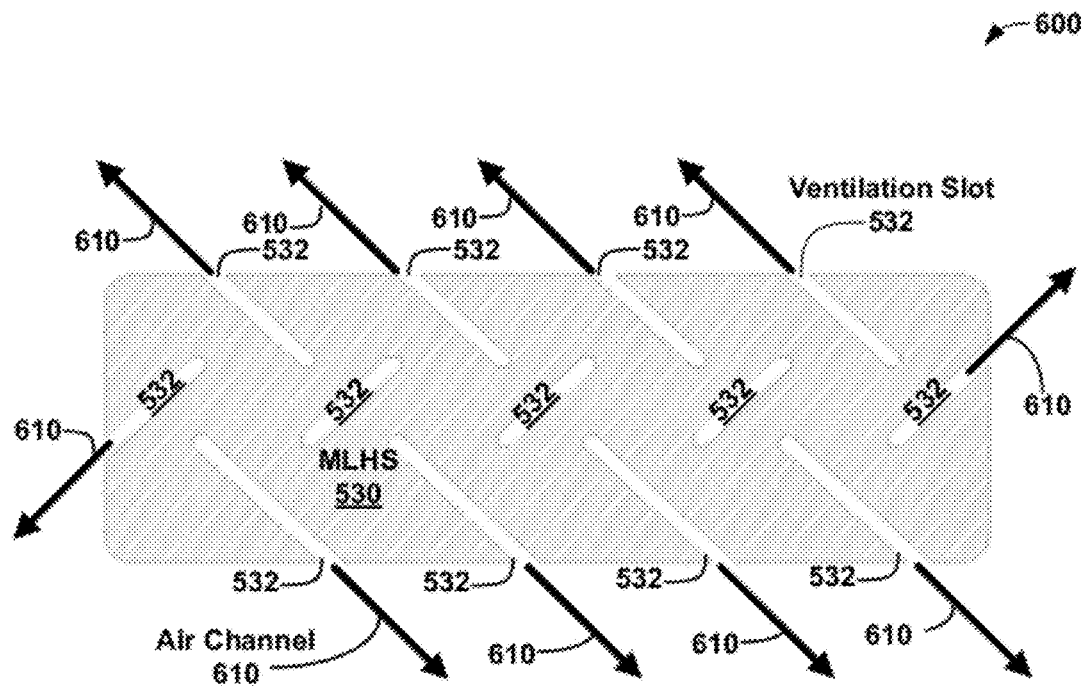
FIGS. 6A and 6B show an example scenario for operating an example multi-layer heat shield.
Figure 6B:
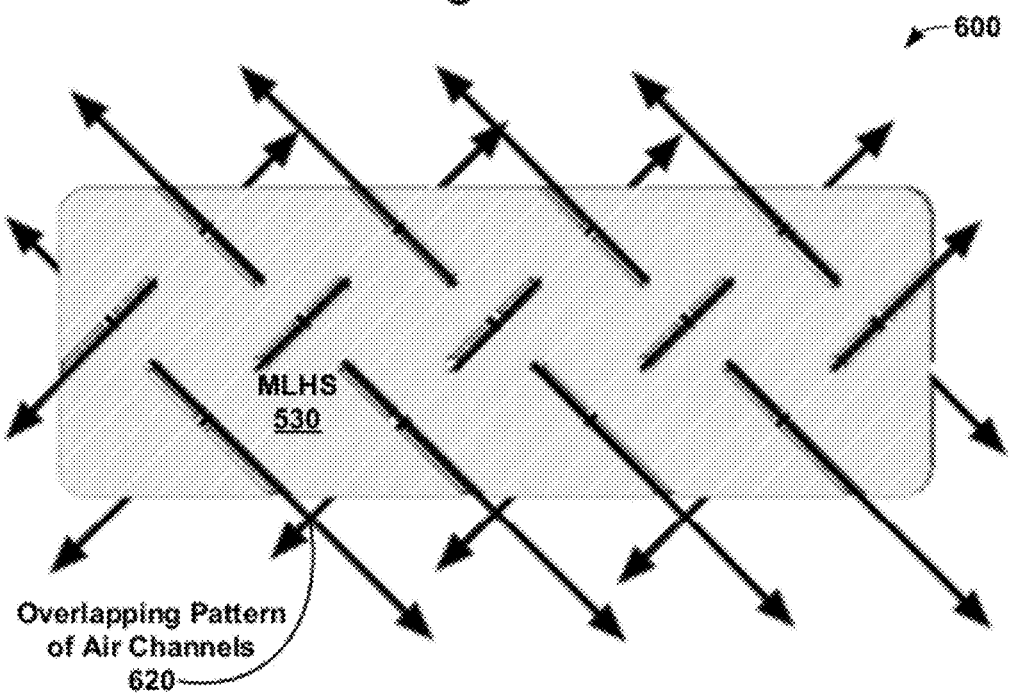

FIGS. 6A and 6B each show a scenario 600 of multi-layer heat shield (MLHS) 530 in operation. FIG. 6A shows one layer of multi-layer heat shield 530 with air flow through ventilation slots 532 that generates air channels 610. FIG. 6B shows an overlapping pattern of air channels 620 generated by two or more layers of multi-layer heat shield 530. FIG. 6B shows that the channels of air in the overlapping pattern of air channels 620 can move back and forth from layer to layer as slots and material overlap. Continuous channels of air, such as overlapping pattern of air channels 620, perhaps along with thermally insulating properties of a material used to construct multi-layer heat shield 530, enable multi-layer heat shield 530 to provide a thermal insulating barrier across virtually the entire surface of shield 530.

Still another example embodiment of the invention provides mirror symmetry of the patterns 510 and 520, as shown in FIG. 5. Mirror symmetry of patterns 510 and 520 allows a single machining template to create all of the layers for the multi-layer shield 530. In some embodiments, the mirror symmetry can be along an axis along the plane of at least a layer of multi-layer heat shield 530; e.g., along the horizontal or vertical axis of a given layer and/or the horizontal or vertical axis of the entirety of multi-layer heat shield 530. Many other patterns of ventilation slots are possible as well, however not all patterns have the mirror symmetry that can produce the continuous channels.

In other embodiments not shown in the figures, a third solid heat shield layer (i.e., a layer without ventilation regions) can be added to the multi-layer shield in FIG. 5 so as to provide a final solid barrier, with the multi-layer heat shield of FIG. 5 sandwiched between it and the brake friction pad backing plate. More generally, any number of layers can be combined to provide any three dimensional pattern of air channels and thermal shields.

Figure 7:
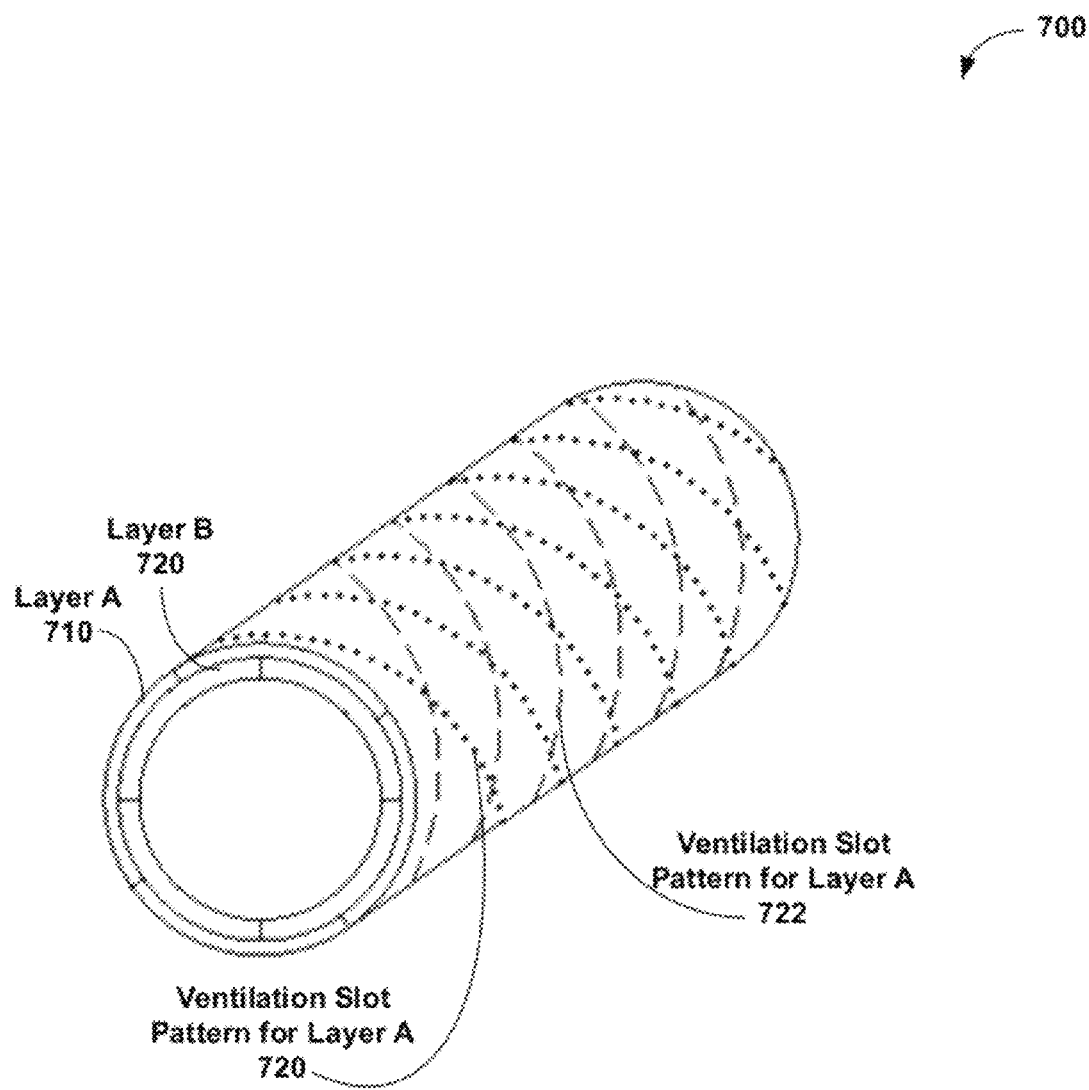
FIG. 7 shows an example embodiment of a cylindrically-shaped multi-layer heat shield.

In addition to flat surfaces, a multi-layer heat shield can be shaped to fit other surfaces such as curved surfaces, cylinders, and bent tubing. FIG. 7 shows an example embodiment of a cylindrically-shaped multi-layer ventilated heat shield 700 with two layers: layer A 710 and layer B 720. Layers 710 and 720 each have a respective pattern of diagonal ventilation slots 712 and 722. Such a cylindrical-shaped multi-layer ventilated heat shield 700 can be formed in a number of ways; for example, by taking a flat ventilated heat shield of the appropriate size, such as an appropriately-sized multi-layer ventilated heat shield 530, and curving each layer of the flat multi-layer ventilated heat shield 530 to fit a desired circumference of a cylinder. In particular embodiments, cylindrically-shaped multi-layer ventilated heat shield 700 can have only one layer; while in still other embodiments cylindrically-shaped multi-layer ventilated heat shield 700 can include three or more layers, including solid heat shield layer(s), as discussed above in the context of flat ventilated heat shields.

Figure 8:
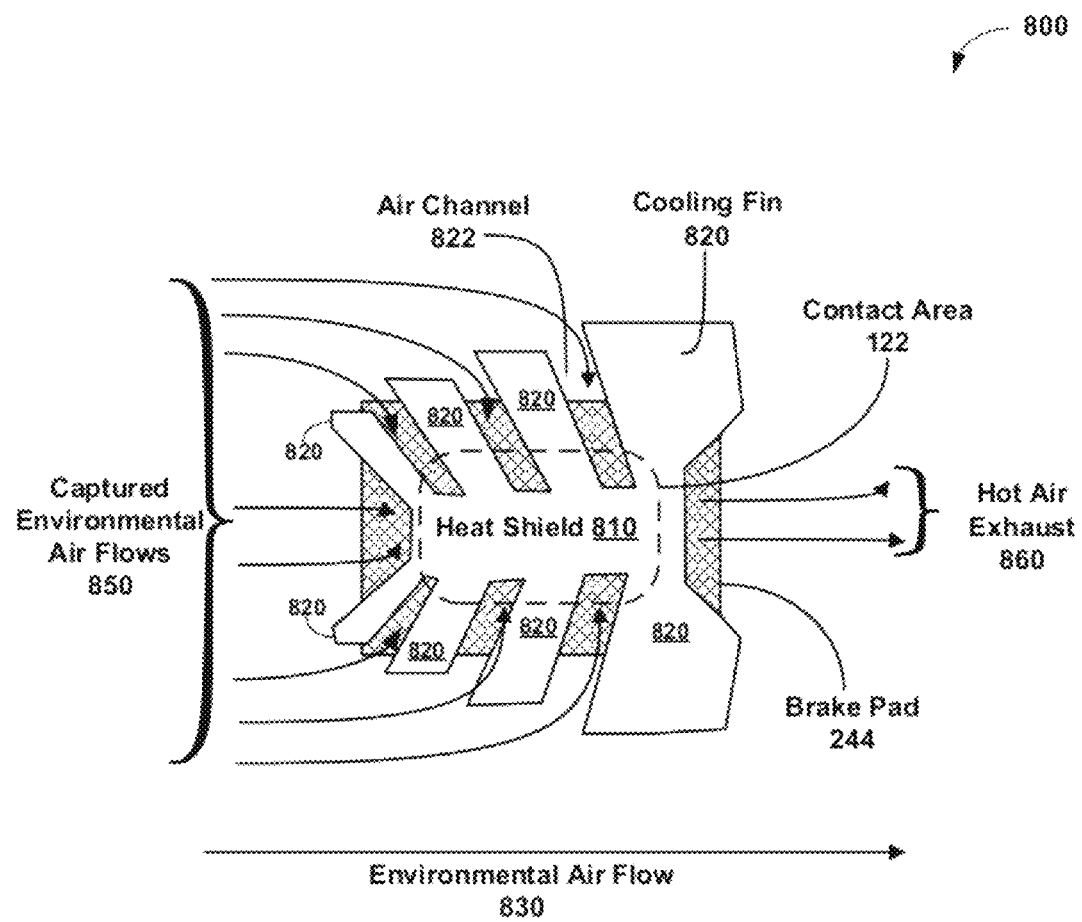
FIG. 8 shows an example embodiment of the heat shield with extensions beyond the profile of a brake pad.

In some embodiments, the size of a ventilated heat shield may differ from the size of the contact surfaces. For some example scenarios, when the size of the ventilated heat shield exceeds the size of the contact surface, the ventilated heat shield can dissipate heat away from the contact surfaces and bring in greater amounts of cooling air. FIG. 8 shows an example single layer ventilated heat shield 810 against brake pad 244. The heat shield 810 includes at least one cooling fin 820 that extends beyond the outline of the brake pad 244 and the contact area with the caliper piston 242. Extending cooling fins 820 beyond brake pad 244 allows the material in the heat shield 810 to dissipate heat further away from contact area 122 (shown in FIG. 8 with dashed lines).

In addition, the design of heat shield 810 provides ventilation channels that can be shaped to capture and bring in environmental air flows 850 and direct the flow of hot air exhaust 860 away from the contact area. This technique can be effective in embodiments where there is an environmental air flow 830 present to allow the existing airflow to increase the circulation of cooling air through the contact area.

Figure 9:
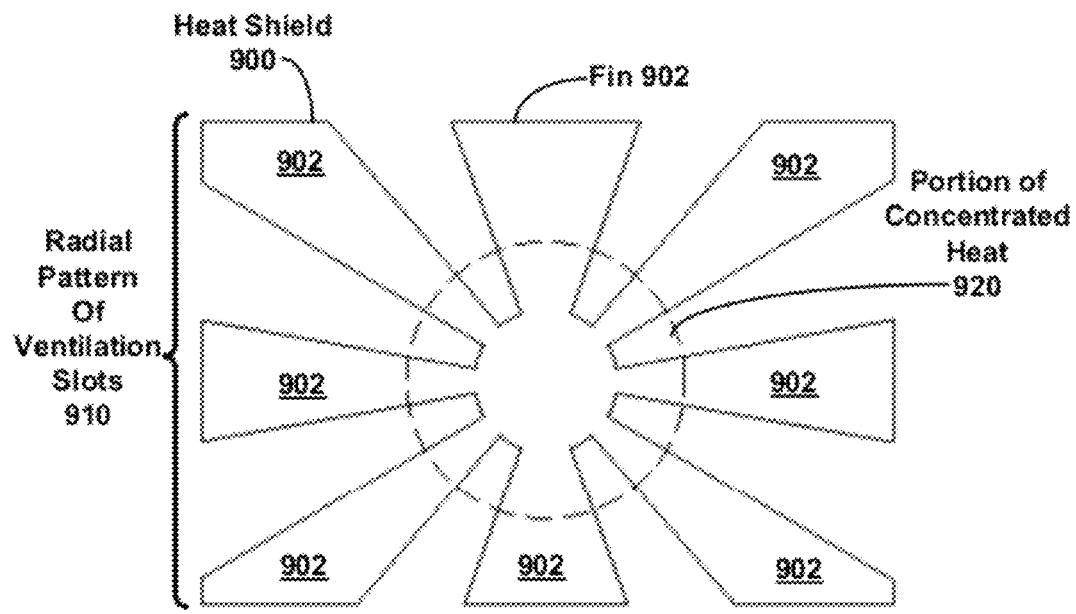
FIG. 9 shows an example embodiment of the heat shield in which the cooling channels are concentrated on a particular area of the surface.

A ventilated heat shield can include a non-uniform pattern of ventilation slots in order to optimize the patterns of insulation and airflow for particular applications. FIG. 9 shows an example embodiment of a single-layer heat shield 900 configured with a radial pattern of ventilation slots 910 formed by fins 902. The radial pattern of ventilation slots 910 can be configured to concentrate air flow into and conduct escaping heat away from a portion of concentrated heat 920. For example, in operation in a braking application, a portion of concentrated heat 920 can be formed at a contact area between a caliper piston and heat shield. The use of various distributions of ventilation slots can concentrate insulation and ventilation to better cool one or more portion of concentrated heat on a contact surface.

Figure 9A:
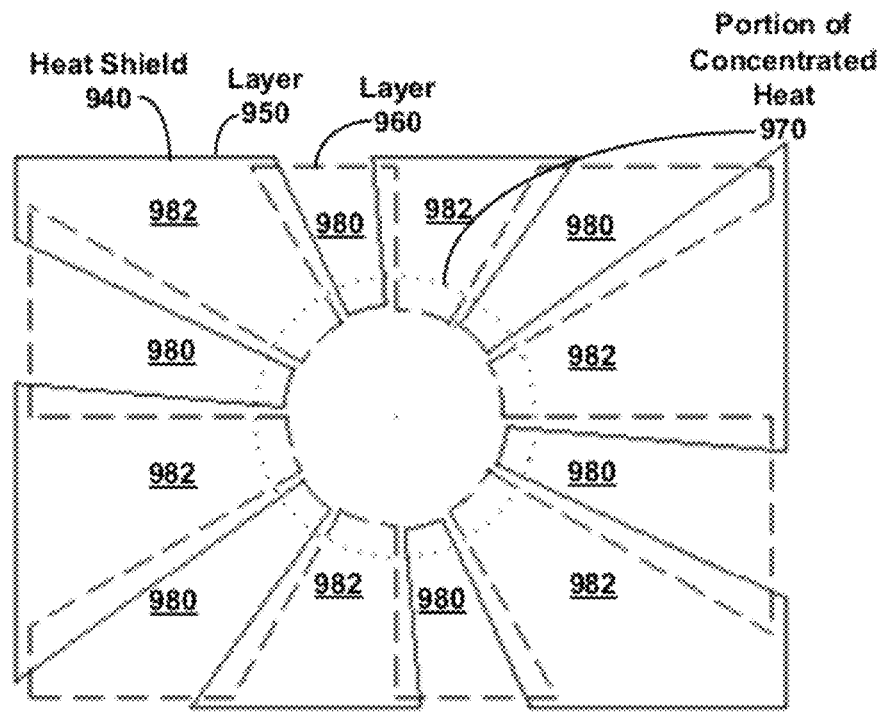
FIG. 9A shows an example multi-layer embodiment of the heat shield in which the cooling channels are concentrated on a particular area of the surface.

FIG. 9A shows an example embodiment 900 of a multi-layer heat shield 940 with two layers 950 and 960. In FIG. 9A, layer 950 is shown with solid lines and layer 960 is shown with dashed lines. Each of layers 950 and 960 is configured with radial pattern of ventilation slots 910 shown in FIG. 9 to concentrate heat flow away from, and cooling air toward, a portion of concentrated heat 970. FIG. 9A shows layer 950 with ventilation slots 980 and layer 960 with ventilation slots 982, where ventilation slots 982 are backed by fins of layer 950, and ventilation slots 980 are backed by fins of layer 960. This multi-layer pattern provides a continuous thermal barrier over the entire surface while still allowing flow of air into and out of the portion of concentrated heat.

Figure 10:
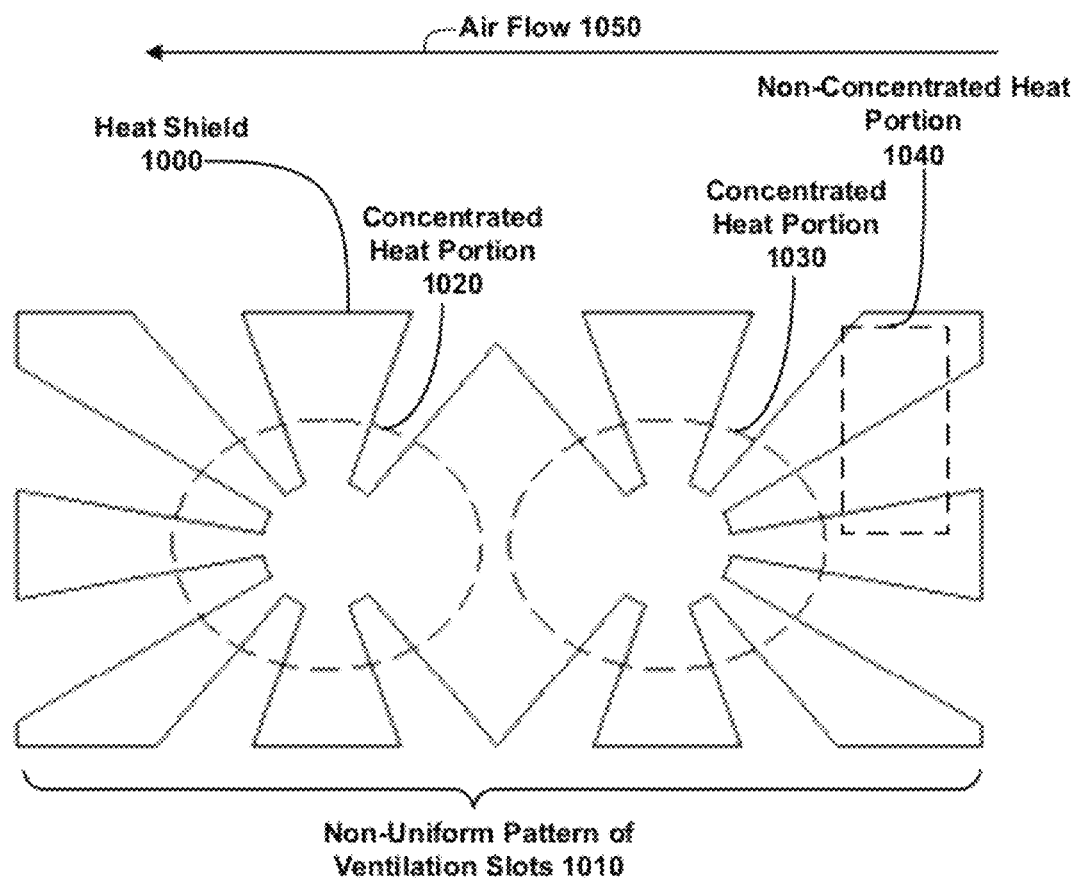
FIG. 10 shows an example embodiment of the heat shield in which the cooling channels are concentrated on two particular areas of the surface.

FIG. 10 shows an example heat shield 1000 configured with a non-uniform pattern of ventilation slots 1010. In some applications, multiple concentrated heat portions can be cooled. The non-uniform pattern of ventilation slots 1010 can be configured to concentrate air flow into, and permit heat to escape from, two concentrated heat portions 1020 and 1030. For example, in a braking system with more than one caliper piston contacting a brake pad, each contact point between a caliper piston and the brake pad can act as a concentrated heat portion. Non-uniform patterns of ventilation slots, such as pattern 1010, can be used to maximize the airflow and permit heat to escape from concentrated heat portions.

The additional air flow can provide non-uniform cooling to a contact area of heat shield 1000. For example, when air flows in a direction of air flow 1050 as shown in FIG. 10, more of air flow 1050 can be directed to concentrated heat areas 1020 and 1030 than to other areas, such as non-concentrated heat area 1040. Thus, by use of various patterns of ventilation slots, such as but not limited to patterns 514, 524, and 534, radial pattern 910, and non-uniform pattern 1010, either uniform or non-uniform cooling over a contact area can be achieved.

Figure 11:
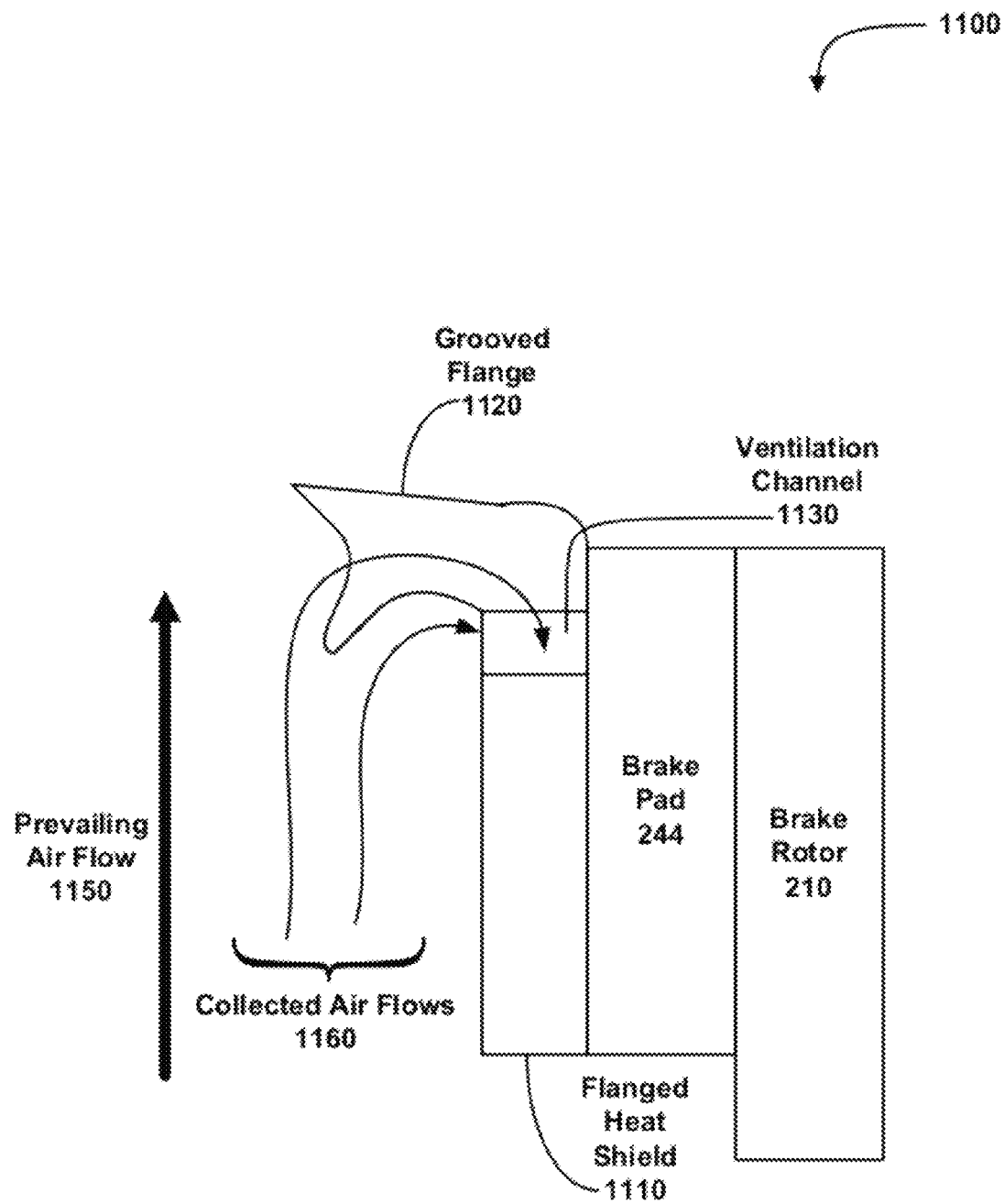
FIG. 11 shows an example embodiment of the heat shield in which a flange is added to the shield to funnel air into a cooling channel.

Aspects of a design of a ventilated heat shield can increase the amount of cooling air flowing past the heat shield. FIG. 11 shows an example flanged heat shield 1100 with flange 1120 extruding from the plane of flanged heat shield 1100. Flange 1120 is configured to collect additional air from prevailing air flow 1150 and direct the collected air flows 1160 into a ventilation channel 1130. In applications where there is an environmental air-flow in a prevailing direction, such as automotive braking systems, this design allows that air to be effectively funneled into a heated contact area protected by the ventilated heat shield 1100.

Figure 12:
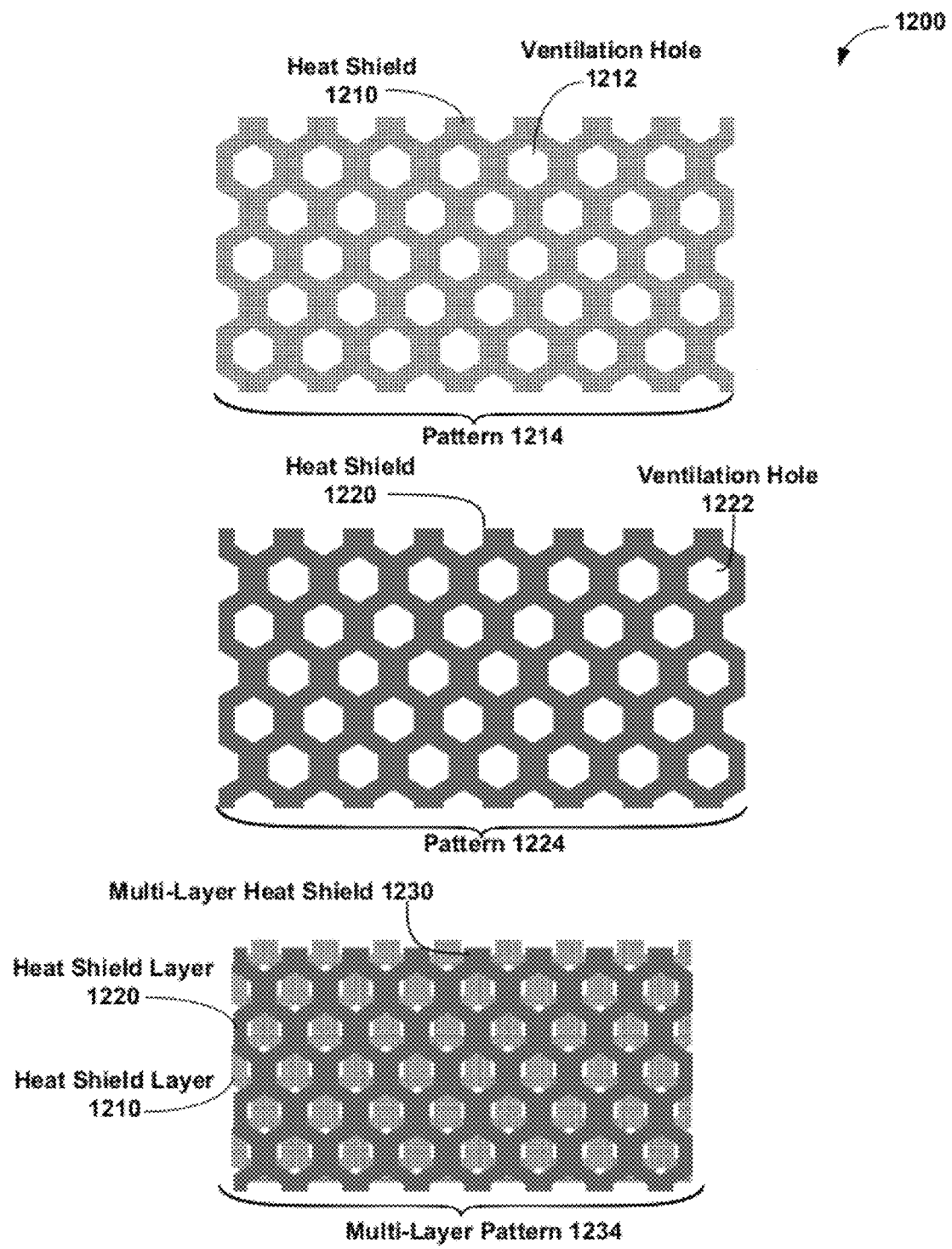
FIG. 12 shows an example embodiment of the heat shield using ventilation holes.

FIG. 12 shows example embodiments 1200 of heat shields with ventilation holes. Heat shields 1210 and 1220 are single-layer heat shields. In particular, heat shield 1210 is constructed with a pattern 1214 of ventilation holes 1212. Additionally, heat shield 1220 uses a different symmetric pattern 1224 than pattern 1214 of ventilation holes 1222. Heat shield 1210 and/or heat shield 1220 can be constructed using a perforated material, where the perforations in the material form a pattern of ventilation holes, such as but not limited to, pattern 1214 or pattern 1224. In some embodiments, such as shown in FIG. 12, patterns 1214 and/or 1224 can have mirror symmetry along one or more axes. For example, both patterns 1214 and 1224 are mirror symmetric along both the horizontal and vertical axes as can be seen in FIG. 12. While FIG. 12 shows that ventilation holes 1212 and 1222 both as being hexagonal in shape, other shaped holes, such as but not limited to round, square, rectangular, triangular, and/or octagonal holes can be used instead or along with hexagonal-shaped holes.

Heat shield 1230 is a multi-layer heat shield. Multi-layer heat shield 1230 can be created by overlaying heat shields 1210 and 1220 as heat shield layers to form overlapping sections of air and insulating materials in pattern 1234. In embodiments not shown in FIG. 12, heat shield 1230 can include three or more layers. FIG. 12 shows that multi-layer heat shield 1230 includes mirror symmetry of the patterns 1214 and 1224. The mirror symmetry of patterns 1214 and 1224 allows a single machining template to create all of the layers for the multi-layer shield 1230. In some embodiments, the mirror symmetry can be along an axis along the plane of at least a layer of multi-layer heat shield 1230; e.g., along the horizontal or vertical axis of a given layer and/or the horizontal or vertical axis of the entirety of multi-layer heat shield 1230. The patterns of ventilation holes in multi-layer heat shield 1230, such as patterns 1214 and 1224, can be configured to provide continuous air channels across a plane of heat multi-layer heat shield 1230. Many other patterns of ventilation holes for heat shields 1210, 1220, and/or 1230 are possible as well.

In some embodiments not shown in the Figures, heat shields can include ventilation holes and slots. For example, some of ventilation slots 404a-404l of ventilated heat shield can be replaced with ventilation holes. As another example, a multi-layer heat shield can be constructed with one or more layers with ventilation slots, such as heat shield layers 510, 520 and with one or more layers with ventilation holes, such as heat shields 1210, 1220. Many other combinations are possible as well.

Figure 13:
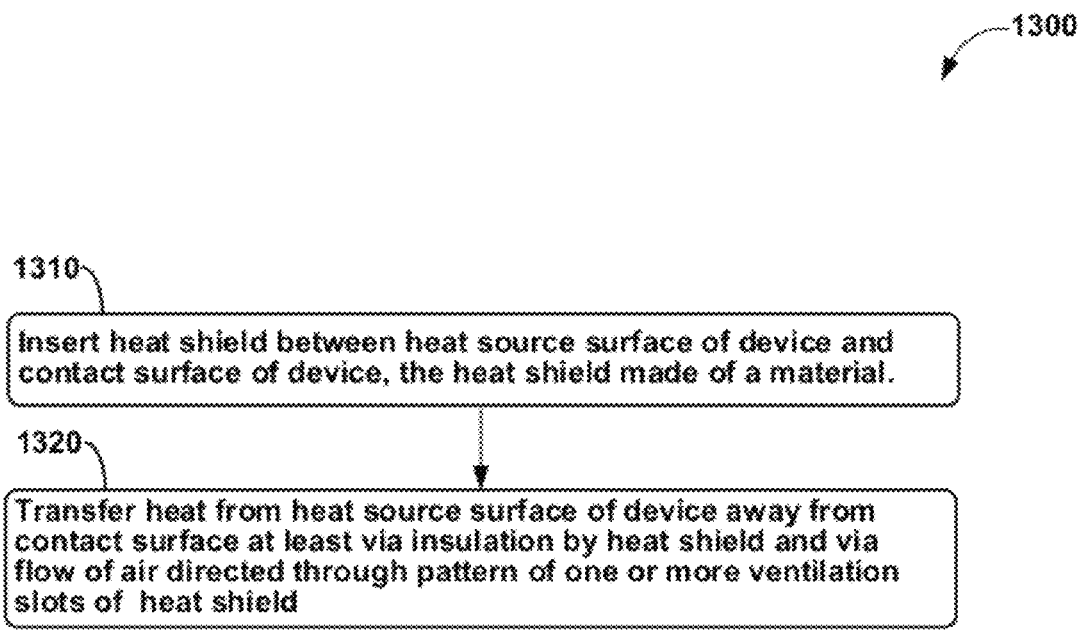
FIG. 13 is a flow chart depicting a method in accordance with an example embodiment.

FIG. 13 is a flow chart of an example method 1300 in accordance with an example embodiment. At block 1310, a heat shield is inserted between a heat source surface of a device and a contact surface of the device. The heat shield can be made of a material. In some embodiments, the material is a rigid non-compressible insulating material.

In some embodiments, the heat source surface and/or the contact surface can be configured with a pattern of ventilation slots, such as discussed above at least in the context of FIG. 5A. For example, a surface of a brake pad can be configured with a pattern of ventilation slots. In still other embodiments, the heat source surface can be a brake pad and the contact surface can be a caliper piston, such as discussed above at least in the context of FIGS. 1 and 2. In even other embodiments, the heat source surface can be a heat emitting surface of an electrical device, such as but not limited to a microprocessor. In these even other embodiments, the heat shield can be configured to be embodied in a heat sink.

At block 1320, heat is transferred from the heat source surface of the device away from the contact surface. The heat is transferred at least via insulation by the heat shield and via a flow of air directed through a pattern of one or more ventilation regions of the heat shield. A ventilation region can include one or more ventilation slots, ventilation holes, and/or ventilation grooves.

In some embodiments, the pattern of one or more ventilation regions comprise a diagonal pattern of ventilation slots, such as discussed above at least in the context of FIGS. 5 through 7. In other embodiments, the pattern of one or more ventilation regions is a vertical pattern of ventilation slots, such as discussed above at least in the context of FIG. 4. In other embodiments, the pattern of one or more ventilation regions is a radial pattern of ventilation slots, such as discussed above at least in the context of FIGS. 9 and 9A. In still other embodiments, the pattern of one or more ventilation regions is configured to provide a non-uniform reduction in the transfer of heat, such as discussed above at least in the context of FIG. 10. In yet other embodiments, the pattern of one or more ventilation regions comprise a pattern of ventilation holes, such as discussed above at least in the context of FIG. 12.

In other embodiments, the heat shield can have a single layer. In other embodiments, the heat shield can include two or more layers, where at least one layer of the heat shield is configured with at least one ventilation region of the one or more ventilation regions. Single-layer and multi-layer heat shields with ventilation regions are described above in more detail in the context of at least FIGS. 2 through 12.

In some multi-layer heat shield embodiments, a first layer of a plurality of layers in the multi-layer heat shield has a first pattern of ventilation regions, and a second layer of the plurality of layers comprises a second pattern of ventilation regions, such as discussed above in more detail in the context of at least FIGS. 5-7, 9A, and 12. In particular of these multi-layer heat shield embodiments, the first pattern of ventilation regions includes a reverse pattern of the second pattern of ventilation regions, such as discussed above at least in the context of FIGS. 5 through 6B. In other particular of these multi-layer heat shield embodiments, the first and second patterns of ventilation regions can be configured to provide continuous air channels across a plane of the heat shield, such as discussed above at least the context of FIGS. 6A, 6B, and 12.

In other multi-layer heat shield embodiments, the plurality of layers includes a third layer that comprises a solid heat shield layer. Solid heat shield layers are discussed above at least in the context of FIGS. 5 and 7.

In still other embodiments, the heat source surface includes a surface of a brake pad, and the contact surface includes a surface of a caliper piston, such as described above in the context of at least FIGS. 2, 3, 8, and 9. In even other embodiments, the heat source surface comprises a heat-emitting surface of an electrical device, and the heat shield is configured to be embodied in a heat sink.

In yet other embodiments, the heat shield comprises a flange. The flange can be configured to collect air from a prevailing airflow. Heat shields with flanges are discussed above in more detail at least in the context of at least FIG. 11.

In particular other embodiments, the heat shield includes a curved heat shield, such as discussed above in the context of at least FIG. 7; while in even other particular embodiments, the heat shield includes a flat heat shield, such as discussed above in the context of at least FIGS. 1-6 and 8-11.

In specific embodiments, a contact surface can be configured with a pattern of ventilation slots, such as discussed above in the context of at least FIG. 5A.

Alternative embodiments are included within the scope of the herein-described example embodiments. In these alternative embodiments, for example, more or fewer blocks and/or functions may be used with any of the ladder diagrams, scenarios, and flow charts discussed herein, and these ladder diagrams, scenarios, and flow charts may be combined with one another, in part or in whole.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus, comprising:
   a brake pad;
   a piston; and
   a heat shield, made of a material and comprising a pattern of one or more ventilation regions,
   wherein the heat shield is configured to be placed between the brake pad and the piston to reduce transfer of heat from at least a portion of a surface of the brake pad to a surface of the piston at least by insulation and air flow, the air flow directed by the pattern of the one or more ventilation regions away from the portion of the brake pad,
   wherein the heat shield comprises a plurality of layers, wherein at least one layer of the heat shield is configured with at least one ventilation region of the one or more ventilation regions, wherein a first layer of the plurality of layers comprises a first pattern of ventilation regions, and wherein a second layer of the plurality of layers comprises a second pattern of ventilation regions that differs from the first pattern.

2. The apparatus of claim 1, wherein the material comprises a rigid non-compressible insulating material.

3. The apparatus of claim 1, wherein the one or more ventilation regions comprise a ventilation slot.

4. The apparatus of claim 1, wherein the one or more ventilation regions comprise a ventilation hole.

5. The apparatus of claim 1, further comprising a third layer of the plurality of layers, wherein the third layer is a solid layer, and the third layer of the plurality of layers is between the caliper piston and either the first layer or the second layer.

6. The apparatus of claim 1, wherein the first pattern of pattern of ventilation regions comprises a reverse pattern of the second pattern of ventilation regions.

7. The apparatus of claim 1, wherein the first pattern comprises a diagonal pattern of ventilation slots.

8. The apparatus of claim 1, wherein the first pattern of ventilation regions differs from the second pattern of ventilation regions based on mirror symmetry about an axis in a plane of the apparatus.

9. The apparatus of claim 1, wherein the first and second patterns of ventilation regions are configured to provide continuous air channels across a plane of the heat shield.

10. The apparatus of claim 1, wherein a surface of the brake pad is configured with a pattern of ventilation slots.

11. A method, comprising:
    inserting a heat shield between a heat source surface of a device and a contact surface of the device, the heat shield made of a material; and
    transferring heat from the heat source surface of the device away from the contact surface at least via insulation by the heat shield and via flow of air directed through a pattern of one or more ventilation regions of the heat shield,
    wherein the heat shield comprises a plurality of layers, wherein at least one layer of the heat shield is configured with at least one ventilation region of the one or more ventilation regions, wherein a first layer of the plurality of layers comprises a first pattern of ventilation regions, and wherein a second layer of the plurality of layers comprises a second pattern of ventilation regions that differs from the first pattern.

12. The method of claim 11, wherein the one or more ventilation regions comprise a ventilation slot.

13. The method of claim 11, the one or more ventilation regions comprise a ventilation slot.

14. The method of claim 11, wherein the pattern of ventilation regions comprises a diagonal pattern of ventilation slots.

15. The method of claim 11, wherein the plurality of layers further comprise a third layer, and wherein the third layer comprises a solid heat shield layer.

16. The method of claim 11, wherein the heat source surface comprises a surface of a brake pad, and wherein the contact surface comprises a surface of a caliper piston.

17. The method of claim 11, wherein the contact surface is configured with a pattern of ventilation slots.

* * * * *